United States Patent [19]
Herbst

[11] Patent Number: 4,941,528
[45] Date of Patent: Jul. 17, 1990

[54] CEILING MADE OF METAL PANELS

[76] Inventor: Donald Herbst, Marienplatz 11, D-1000 Berlin 45, Fed. Rep. of Germany

[21] Appl. No.: 219,659

[22] Filed: Jul. 15, 1988

[30] Foreign Application Priority Data

Jul. 15, 1987 [DE] Fed. Rep. of Germany ........ 3723792

[51] Int. Cl.$^5$ .............................................. F28D 7/08
[52] U.S. Cl. .................................. 165/56; 165/46
[58] Field of Search ................ 165/49, 56, 171; 52/220

[56] References Cited

U.S. PATENT DOCUMENTS

| | | | |
|---|---|---|---|
| 2,718,383 | 9/1955 | Frenger | 165/56 |
| 2,721,731 | 1/1951 | Rapp | 52/145 X |
| 3,807,114 | 5/1974 | Ollinger | 52/144 X |
| 4,338,994 | 7/1982 | Hewing | 165/49 |
| 4,338,995 | 7/1982 | Shelly | 165/171 X |
| 4,635,710 | 1/1987 | Shelly | 165/49 |
| 4,702,046 | 10/1987 | Haugen | 52/144 |
| 4,766,951 | 8/1988 | Bergh | 165/49 X |

FOREIGN PATENT DOCUMENTS

| | | | |
|---|---|---|---|
| 683426 | 3/1964 | Canada | 165/49 |
| 2602272 | 8/1977 | Fed. Rep. of Germany | 165/49 |
| 3124048 | 12/1982 | Fed. Rep. of Germany | . |
| 1257121 | 2/1961 | France | 52/220 |
| 0188943 | 6/1982 | Japan | 165/56 |
| 897749 | 5/1962 | United Kingdom | 165/49 |
| 2083605 | 9/1982 | United Kingdom | 165/56 |

Primary Examiner—David A. Scherbel
Assistant Examiner—Jerrold D. Johnson
Attorney, Agent, or Firm—Basile and Hanole

[57] ABSTRACT

A ceiling consisting of metal panels (1) and a support structure (2) for them is described, which carries flexible tubes (4) through which flows a heating or cooling medium for obtaining a desired room temperature. The tubes are combined in the form of a mat and lie loosely and directly upon said metal panels.

12 Claims, 1 Drawing Sheet

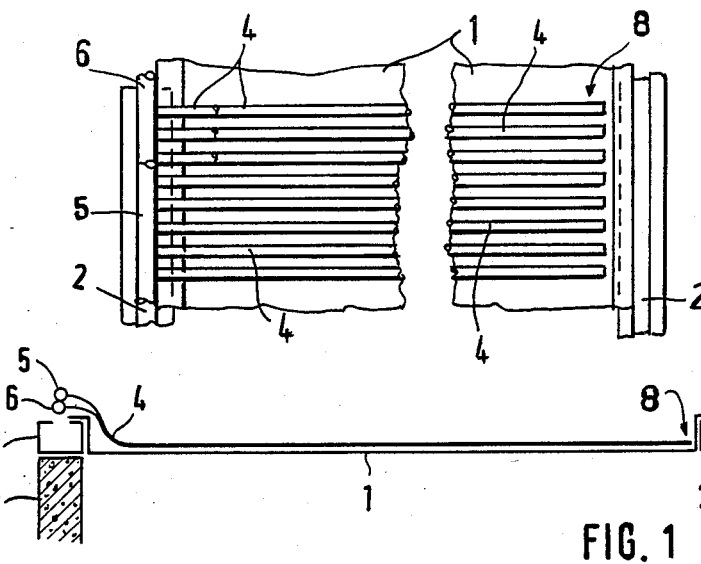
FIG. 4
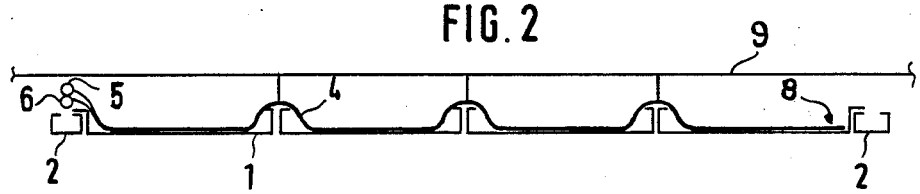
FIG. 1
FIG. 2
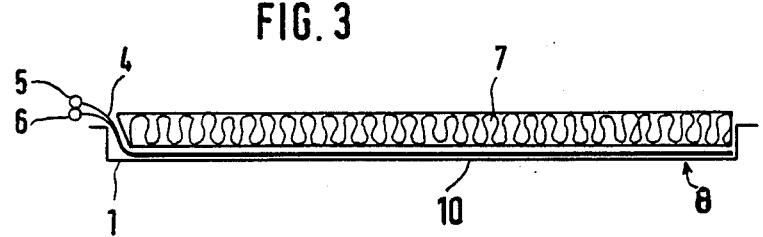
FIG. 3
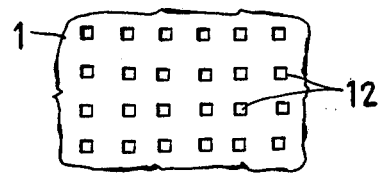
FIG. 5

CEILING MADE OF METAL PANELS

BACKGROUND OF THE INVENTION

1. Field of the Invention

The invention relates to a panelled room ceiling having flexible heating and cooling tubes disposed adjacent and above thereto for achieving a predetermined room temperature.

2. Description of the Prior Art

Ceilings for heating or cooling the underlying room are known, in which metal panels are suspended from a support structure and pipes for the passage of a heating or cooling medium are fastened to said panels or support structure. The connection between the pipes and the metal panels should be solid and have a high heat conductivity so as to obtain a high heating or cooling effect. This is true particularly in the case of cooling since there the temperature differences must be relatively small in order to exclude the danger of formation of water due to condensation. Since the metal panels must be restricted in size on account of the possibility of handling them, the pipes will also have a restricted length, if they are fastened to the metal panels during assembly, resulting in a plurality of pipe junctions. This renders the assembly of the ceiling more difficult and enhances considerably the danger of leakage. If continuous pipes extending in one direction over the whole ceiling are used, either the pipes must be fastened to the assembled metal panels, or the metal panels must be fastened to the assembled pipes. Both processes require a very large expenditure of work. Another considerable disadvantage of such a construction is the difficulty of removing individual metal panels from the ceiling in order to obtain access to the space above the metal panels or for replacing individual panels. Also the replacement of the pipes is very complicated.

From the periodical "Gesundheits-Ingenieur", vol. 1962, issue 5, page 150, a metal ceiling consisting of individual panels and a supporting structure is known, which may be used as covering, sound absorber, ventilating system and, if heating pipes are built into the hollow space, as a radiator ceiling. Such heating pipes are rigid individual pipes which are not in direct contact with the metal panels. In order to obtain a sufficient heating effect, there must be created a considerable temperature difference between the heating pipe surface and its surroundings. The same holds true when the pipes are used for cooling. In this case, however, there will be a formation of condensed water on the pipes so that a cooling effect will be practically impossible. Furthermore there are the assembling difficulties as described above.

SUMMARY OF THE INVENTION

It is, therefore, the object of this invention, to create a ceiling consisting of metal panels and a supporting structure for the same, which carries pipelines through which flows a heating or cooling medium, in order to obtain desired temperature degrees within a room, which is easy to assemble and permits later repair or maintenance work without difficulties while obtaining nevertheless a high heating or cooling effect respectively.

The invention is distinguished by the fact that the tubular pipeline consist of flexible tubes which are combined in the form of mats and lie directly upon the metal panels. Since there is no rigid connection between the tubes and the metal panels, the latter may be replaced without the need of first detaching such a connection. Whenever access to the space above said metal panels is required, such a metal panel may be taken out and the mat consisting of the tubes may easily be folded aside and lifted. Such tubes combined in the form of mats as described have been known e.g. from DE-PS 31 24 048.

The tubes are preferably fixed with respect to the ceiling at their feeding and return connections only, such connections being suitably disposed at the same lateral edge of the ceiling. This assures the highest possible mobility of the tubes with respect to the ceiling.

BRIEF DESCRIPTION OF DRAWINGS

FIG. 1 a vertical section through a part of a ceiling with a metal panel,

FIG. 2 a vertical section through a part of a ceiling with a plurality of metal panels, FIG. 3 a vertical section through a part of a ceiling with a metal panel and a thermal insulation layer, FIG. 4 a top view showing a plurality of tubes forming a mat, and FIG. 5 a top view showing cut-outs.

DETAILED DESCRIPTION OF THE PREFERRED EMBODIMENTS

FIG. 1 shows a metal panel 1 with raised angular edges which rest on profile ledges 2 which in turn rest on room walls 3, or are fastened to them by other means. Tubes 4 lie directly on the metal panel 1. The tubes 4 may consist of plastic, or other suitable flexible material, and have an outer diameter of 2 mm approximately. A heating or cooling medium is disposed within tubes 4 for circulation therethrough. The tubes 4, lying one behind the other perpendicularly with respect to the drawing plane and parallel to one another, are joined at their ends so that one end of each tube 4 is jointly connected to a common feed main 5, and the other end of each tube 4 is jointly connected to a common return main 6 for said medium. The tubes 4 are bent by 180 at one edge of the metal panel 1 indicated by the right edge of panel 1 in FIGS. 1–3, and are led back so that the common feed main 5 and the common return main 6 are situated at the same edge side of the ceiling. Since the tubes 4 are fixed in the ceiling by two common mains 5 and 6 only, they are freely movable at the opposite edge side 8 with respect to the ceiling. Since the tubes 4 have an outer diameter of 2 mm approximately, and are relatively densely packed aside one another, a plurality of tubes 4 lies on the metal panel 1 in the form of a mat as shown in FIG. 4.

Since the tubes 4 are lying directly upon the metal panel 1, heat is easily conducted between them. The arrangement assures a high heating or cooling effect so that only relatively small temperature differences are required between the surface of the tubes 4 and their surroundings. Additionally, due to the plurality of tubes 4, a relatively constant temperature is maintained over the total area of the metal panel 1.

FIG. 2 shows a vertical section through a part of a ceiling in the longitudinal direction of tubes 4. The only difference with respect to FIG. 1 is that a plurality of metal panels are represented which are disposed adjacent to one another in the longitudinal direction of the tubes 4, which may occupy, e.g., a plane face bridging the whole room. In this case, the tubes 4 pass over the bent-up edges formed at the junctions between adjacent metal panels 1. The bending by 180° of the tubes 4 is effected at the right edge side of the outermost right metal panel 1 in FIG. 2. The connection of the adjacent metal panels is assured in a manner as such known and is therefore not represented here.

FIG. 3 shows a particular arrangement of a metal panel 1 and a sound insulating layer 7 of a sound-absorbing ceiling. A plurality of, for example, circular cut-outs for the passage of sound is made in the metal panel 1. The sound-absorbing layer 7 has the form of a mat and is laid directly upon metal panel 1 and the mat-like tubes 4. It is made preferably of a heat-insulating material such as rock wool disposed in a layer of 25 mm thickness approximately. Said layer 7 may also be placed over a plurality of metal panels in a manner similar to that shown in FIG. 2.

The ceiling, such as represented in FIG. 2, may also subsequently be suspended from a sound-absorbing ceiling a which has been previously installed, such as for example, in the reconstruction of old buildings. For this purpose, the metal panels 1 will be suitably provided with cut-outs 12 for the passage of sound as shown in FIG. 5.

As shown in FIG. 3, an improved sound absorbtion is obtained also by applying a sound-absorbing microporous layer 10 on the lower side of the metal panels 1 provided with the cut-outs; said layer practically not preventing the passage of air. Such a microporous layer may be used alone, or in addition to the sound-absorbing layer 7 on top of the metal panels 1.

The shown ceiling for heating and cooling purposes can easily be assembled and, additionally, repair work may be carried out without being compelled to remove the tubes 4, and with no detachment of tubes 4 from the feed 5 and return mains 6 for the heating or cooling medium being required. Furthermore, excellent heating or cooling properties are thus obtained.

While certain embodiments of the invention have been described in detail above in relation to a ceiling made of metal panels it will be apparent to those skilled in the art that the disclosed embodiment may be modified. Therefore, the foregoing description is to be considered exemplary rather than limiting, and the true scope of the invention is that defined in the following claims.

I claim:
1. A room ceiling comprising:
   ceiling panels attachable together along adjacent edges;
   a supporting structure for supporting said panels in a desired configuration to form a ceiling;
   tubular pipes being above, and in direct contact with said panels, said pipes having a flowable medium passing therethrough, said pipes being formed of flexible tubes disposed closely adjacent one another to form flexible mats of said tubular pipes;
   wherein said pipes possess a degree of flexibility such that said pipes will bend under their own weight to conform to the desired configuration of the ceiling;
   wherein said flowable medium has characteristics for heatin and cooling; and
   wherein a predetermined room temperature may be achieved.

2. The room ceiling, as defined in claim 1, wherein said tubular pipes are of a plastic material.

3. The room ceiling, as defined in claim 1, wherein said tubular pipes are fixed, with respect to said ceiling panels at feed and return connections only.

4. The room ceiling, as defined in claim 3, wherein said feed and return connections of said tubular pipes are located at a common edge of the ceiling.

5. The room ceiling, as defined in claim 1, wherein said tubular pipes pass, in a longitudinal direction, across a plurality of said ceiling panels.

6. The room ceiling, as defined in claim 1, wherein said panels are provided with suitable cut-outs for the purpose of letting sound pass therethrough.

7. The room ceiling as defined in claim 6, further comprising;
   a sound absorbing layer placed above, and adjacent to said tubular pipes.

8. The room ceiling, as defined in claim 7 wherein said sound-absorbing layer is heat-insulating layer.

9. The room ceiling, as defined in claim 8 wherein said sound-absorbing layer comprises rock wool.

10. The room ceiling, as defined in claim 1, wherein said ceiling panels are suspended from a prior disposed sound-absorbing ceiling.

11. The room ceiling as defined in claim 1 wherein said ceiling panels are coated at their lower sidewith a sound-absorbing microporous layer.

12. The room ceiling, as defined in claim 1, wherein said ceiling panels are formed of metal.

* * * * *